United States Patent
Sullivan et al.

(10) Patent No.: US 7,066,487 B2
(45) Date of Patent: Jun. 27, 2006

(54) AIRBAG WITH INTERNAL POSITIONING PANELS FOR SEQUENTIAL DEPLOYMENT

(75) Inventors: Donald Sullivan, Belleville, MI (US); Jeffrey Steven Vinton, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 190 days.

(21) Appl. No.: 10/605,980

(22) Filed: Nov. 11, 2003

(65) Prior Publication Data

US 2005/0098985 A1 May 12, 2005

(51) Int. Cl.
*B60R 21/16* (2006.01)
(52) U.S. Cl. .................... 280/729; 280/743.2
(58) Field of Classification Search ............. 280/729, 280/743.2, 735, 728.3, 730.1, 743.1
See application file for complete search history.

(56) References Cited

U.S. PATENT DOCUMENTS

| | | | | |
|---|---|---|---|---|
| 3,642,303 A | * | 2/1972 | Irish et al. | 280/730.1 |
| 5,520,413 A | | 5/1996 | Mossi et al. | |
| 5,577,765 A | * | 11/1996 | Takeda et al. | 280/729 |
| 5,813,696 A | * | 9/1998 | Hill | 280/743.2 |
| 5,945,184 A | * | 8/1999 | Nagata et al. | 280/743.2 |
| 6,017,057 A | * | 1/2000 | O'Docherty | 280/739 |
| 6,059,312 A | * | 5/2000 | Staub et al. | 280/729 |
| 6,158,765 A | * | 12/2000 | Sinnhuber | 280/729 |
| 6,196,575 B1 | | 3/2001 | Ellerbrok et al. | |
| 6,254,121 B1 | | 7/2001 | Fowler et al. | |
| 6,276,716 B1 | * | 8/2001 | Kato | 280/729 |
| 6,299,202 B1 | | 10/2001 | Okada et al. | |
| 6,439,606 B1 | | 8/2002 | Okada et al. | |
| 6,454,300 B1 | | 9/2002 | Dunkle et al. | |
| 6,786,505 B1 | * | 9/2004 | Yoshida | 280/729 |
| 6,832,780 B1 | * | 12/2004 | Amamori | 280/743.2 |
| 2002/0017774 A1 | | 2/2002 | Igawa | |
| 2002/0113416 A1 | | 8/2002 | Uchida | |
| 2002/0158456 A1 | | 10/2002 | Fischer | |
| 2002/0185845 A1 | | 12/2002 | Thomas et al. | |
| 2003/0006596 A1 | | 1/2003 | Schneider et al. | |
| 2003/0030254 A1 | | 2/2003 | Hasebe | |
| 2003/0034637 A1 | | 2/2003 | Wang et al. | |

* cited by examiner

*Primary Examiner*—David R. Dunn
*Assistant Examiner*—Drew Brown
(74) *Attorney, Agent, or Firm*—Frank A. MacKenzie

(57) ABSTRACT

An airbag (10) is provided that can be sequentially deployed for minimizing the risk of injury to a vehicle occupant (12). This airbag (10) is an inflatable bag having a primary chamber (34) and a secondary chamber (36) that is adjacent to the primary chamber (34). The primary chamber (34) is configured for inflating before the secondary chamber (36). In addition, this primary chamber (34) is utilized for applying a generally downward force the vehicle occupant's lap (14) and abdomen (16). In this way, a substantial portion of the initial deployment force of the airbag (10) is allocated to the occupant's more durable lower body. Also, the primary chamber (34) can be utilized for positioning the occupant's body (12) in a manner best suited for impacting the airbag (10). This airbag (10) is then sequentially deployed in a generally linear direction upward from the primary chamber (34) to the secondary chamber (36).

13 Claims, 4 Drawing Sheets

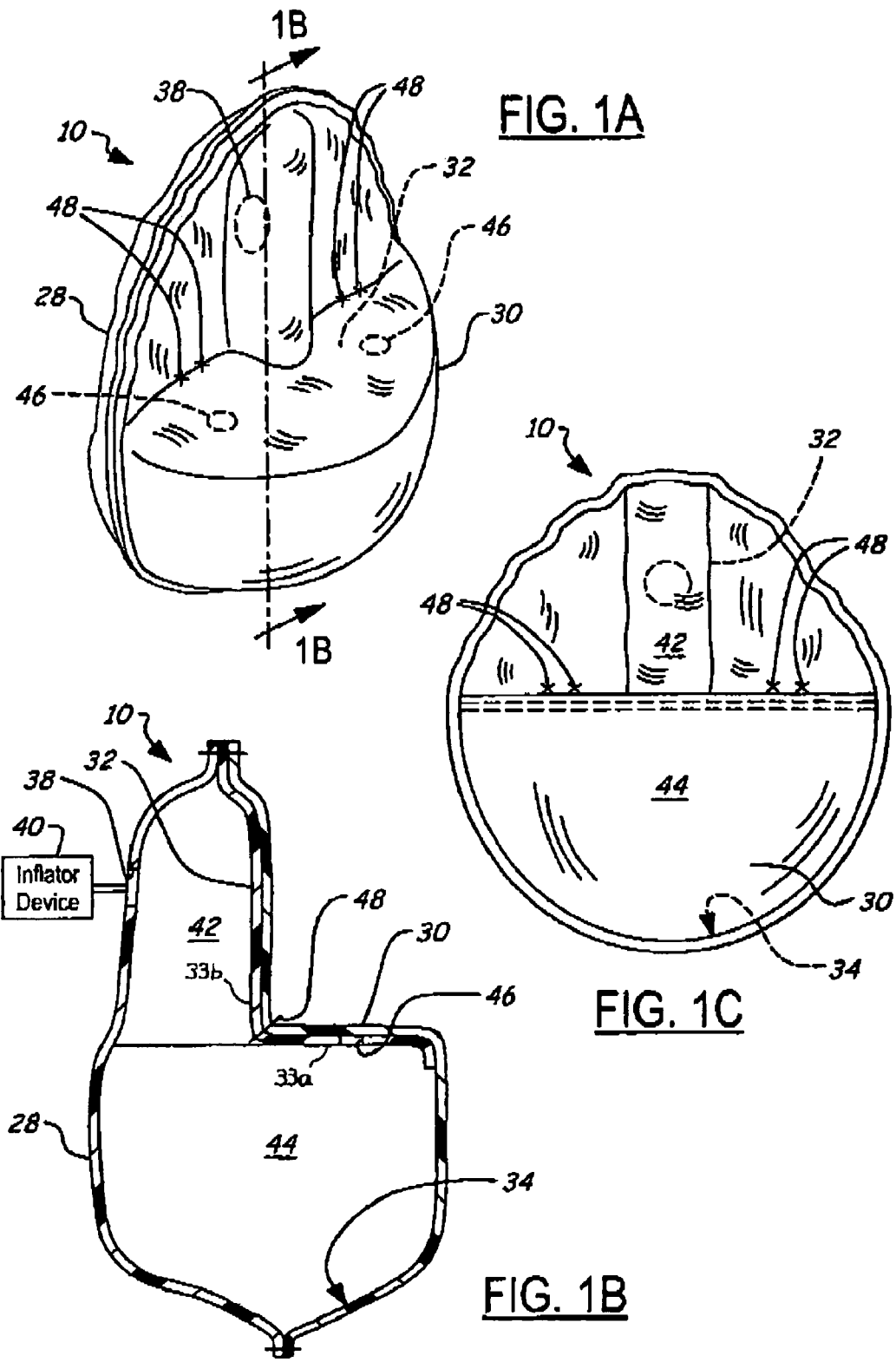

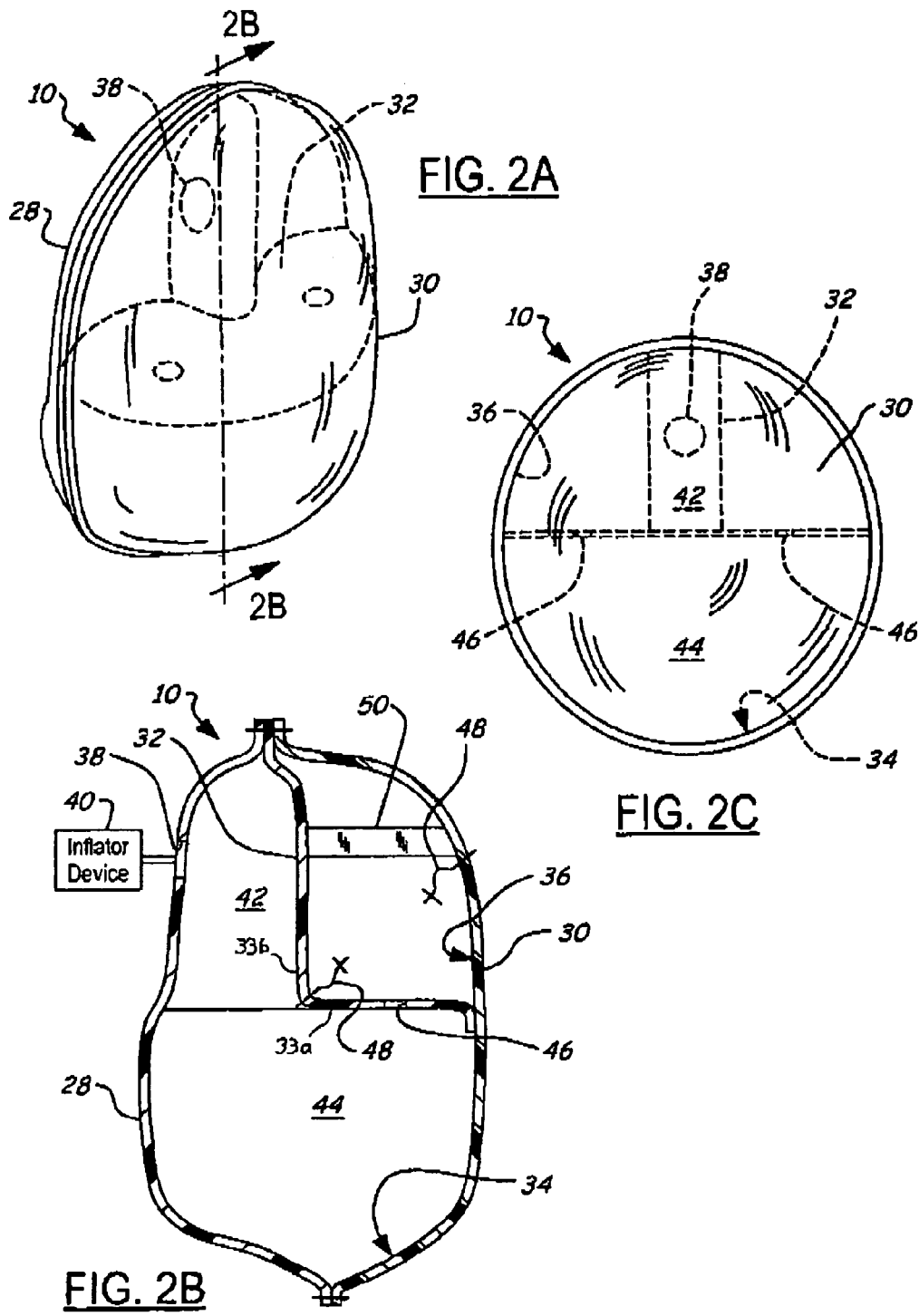

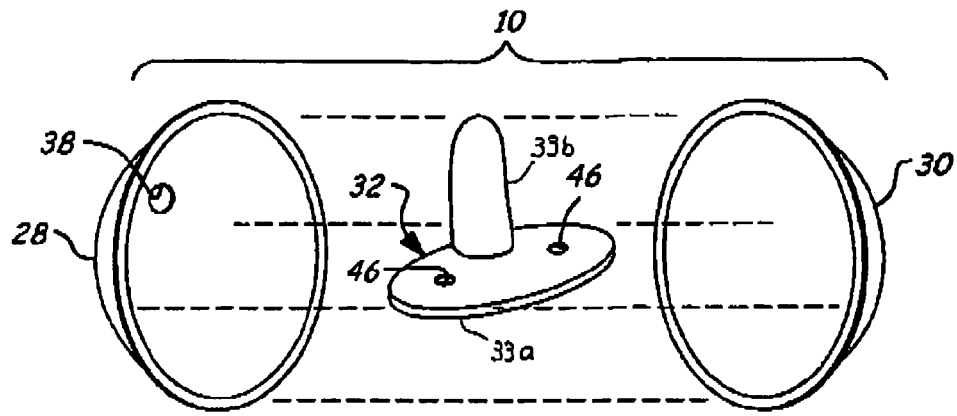
FIG. 4
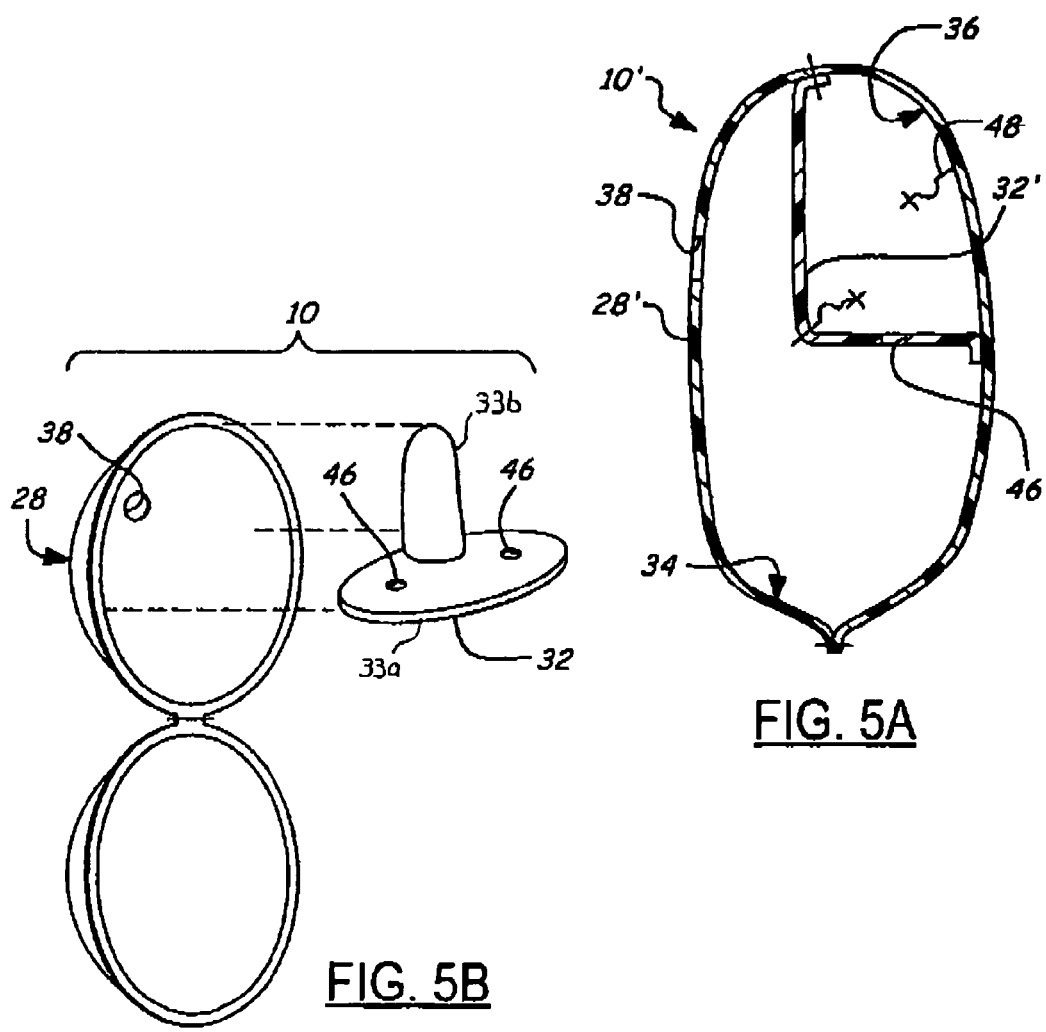
FIG. 5A
FIG. 5B

AIRBAG WITH INTERNAL POSITIONING PANELS FOR SEQUENTIAL DEPLOYMENT

BACKGROUND OF INVENTION

The present invention relates generally to supplemental restraint systems of vehicles, and more particularly to an airbag that can be sequentially deployed for minimizing the risk of injury to an occupant's head and neck.

Driver's side airbags for supplemental restraint systems of vehicles are well known. Typical driver's side airbags are comprised of one or more panels, which form either a single chamber construction or a multiple chamber construction. One of these panels usually includes an inlet that is located at a center position of the panel. This inlet typically allows an inflator device to inject gas into the airbag for deploying the airbag.

The internal construction of these airbags usually causes the airbags to be deployed radially from the center outward. In this regard, various circumferential portions of the airbag can be simultaneously inflated with a substantially equal amount of force. In other words, the portions of the airbag intended to cushion the occupant's head and neck can be inflated at substantially the same time and with substantially the same force as the portions of the airbag intended to cushion the occupant's abdomen and lap.

A drawback of these airbags is that their radial deployment can result in substantial injuries to the occupant's head or neck. Specifically, it is understood that the force required to initially deploy or "punch out" the airbag from its steering-wheel housing can be substantially high. In particular, such a force can be sufficiently high for injuring the occupant's head or neck as the airbag impacts those body parts. Although the radial deployment of the airbag typically causes the airbag to impact the various parts of the occupant's body at substantially the same time and with substantially the same force, it will be appreciated that the occupant's abdomen and lap are less likely to be injured because those body parts typically are more durable for withstanding greater forces. Furthermore, it will be appreciated that the risk of injury can substantially increase when the occupant is sitting out of position. In particular, the deployment of existing airbags may substantially injure a driver's head or neck if the driver is leaning farther forward than a standard upright sitting position.

Another drawback of these airbags is that the radial deployment of the airbags usually does not control the kinematics of the occupant's body for minimizing his risk of injury. Specifically, the radial deployment of these airbags is merely intended to cushion or dampen the overall forces distributed to the occupant's entire body. In this respect, the radial deployment of these airbags typically does not control the method by which various parts of the occupant's body impact the airbag. As a result, one or more parts of the occupant's body may be positioned poorly for impacting the airbag. For example, the airbag may impact an occupant beneath his chin, e.g. his larynx, and force his head upward and rearward. Such a force can create substantial pressure in the vertebrae of the occupant's neck and possibly result in a serious neck injury.

Therefore, a need exists for an airbag with internal panel structure for sequentially deploying the airbag and decreasing an occupant's risk of injury as he impacts the airbag.

The present invention provides an airbag with one or more internal positioning panels for sequentially deploying the airbag and minimizing the risk of injury to a vehicle occupant. This airbag is an inflatable bag having a primary chamber and a secondary chamber that is adjacent to the primary chamber. The primary chamber is configured for inflating before the secondary chamber. In addition, this primary chamber is utilized for applying a generally downward force to a lower-body portion of the vehicle occupant. In this way, a substantial portion of the initial deployment force of the airbag is allocated to the occupant's more durable lower-body portion. Also, the primary chamber can be utilized for positioning the occupant's body in a manner best suited for impacting the airbag. This airbag is then sequentially deployed in a generally linear direction upward from the primary chamber to the secondary chamber.

One advantage of the present invention is that an airbag is provided that controls the kinematics of an occupant's body and the method by which he impacts the airbag so as to decrease his risk of injury.

Another advantage of the present invention is that an airbag is provided that distributes a greater portion of the airbag's initial deployment force to portions of the occupant's body, which are better suited for withstanding those forces without incurring an injury.

Yet another advantage of the present invention is that an airbag is provided that furnishes immediate protection for an occupant's head and neck.

Still another advantage of the present invention is that an airbag is provided that is sequentially deployable for decreasing the impact force between the airbag and the occupant's head and neck.

Other advantages of the present invention will become apparent upon considering the following detailed description and appended claims, and upon reference to the accompanying drawings.

BRIEF DESCRIPTION OF DRAWINGS

For a more complete understanding of this invention, reference should now be made to the embodiments illustrated in greater detail in the accompanying drawings and described below by way of the examples of the invention:

FIG. 1A is a perspective view of an airbag in a first stage of sequential deployment, according to one embodiment of the present invention;

FIG. 1B is a cross-sectional view of the airbag shown in FIG. 1A;

FIG. 1C is a front view of the airbag shown in FIG. 1A;

FIG. 2A is a perspective view of the airbag, shown in FIG. 1A, illustrating the airbag in a second stage of sequential deployment;

FIG. 2B is a cross-sectional view of the airbag shown in FIG. 2A;

FIG. 2C is a front view of the airbag shown in FIG. 2A;

FIG. 4 is an exploded view of a series of panels utilized to form the airbag shown in FIGS. 1A–2C;

FIG. 5A is a cross-sectional view of the airbag shown in FIG. 2B, illustrating an alternative construction of panels of the airbag, according to another embodiment of the invention; and FIG. 5B is an exploded view of a series of panels utilized to form the airbag shown in FIG. 4.

DETAILED DESCRIPTION

Figure 3A:
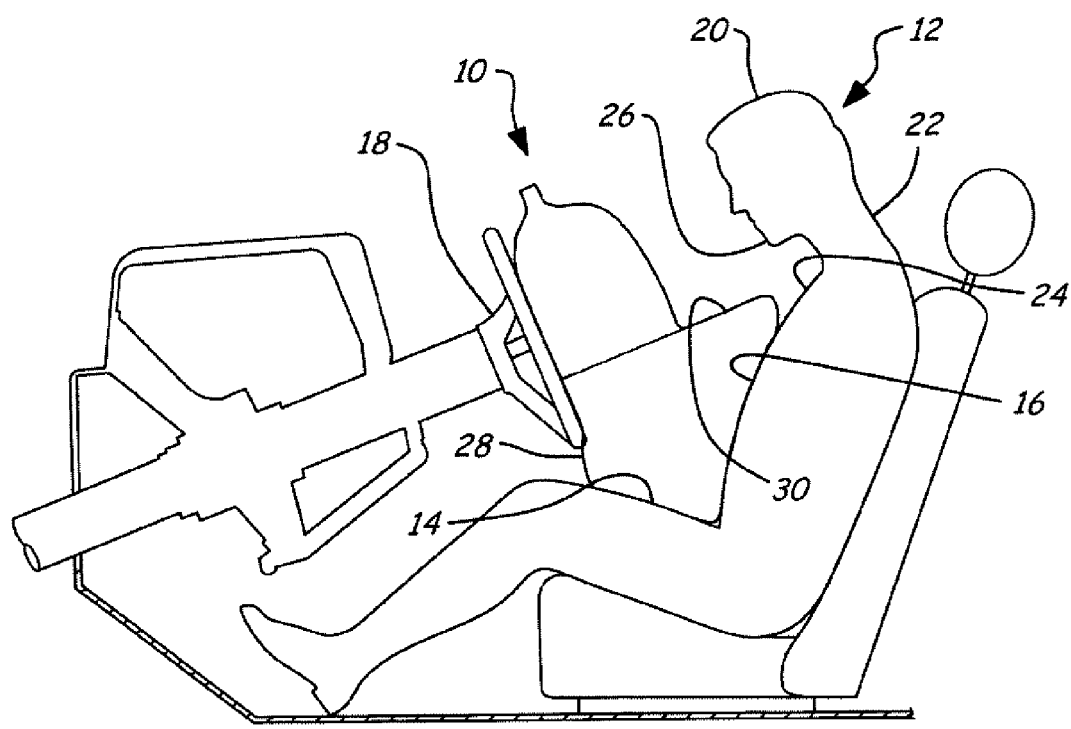
FIG. 3A is a perspective view of the airbag shown in FIG. 1A, illustrating the distribution of an initial airbag deployment force to a vehicle occupant's lower-body region during the first stage of sequential deployment, according to one embodiment of the present invention.

In the following figures, the same reference numerals are used to identify the same components in the various views.

The present invention is particularly suited for an driver's side airbag for sequential two-stage deployment and minimizing a risk of injury during a front-end crash. In this regard, the embodiments described herein employ structural features where the context permits. However, it is understood that a variety of other embodiments without the described features are contemplated as well. For example, the airbag can be utilized for protecting various vehicle occupants besides the driver and in a variety of collisions, instead of front-end crashes. For this reason, it follows that the invention can be carried out in various other modes and utilized for other suitable applications as desired.

Referring to FIGS. 1A and 2A, there are shown perspective views of an airbag 10, respectively illustrating the airbag 10 in a first stage of sequential deployment and a second stage of sequential deployment, according to one embodiment of the invention.

Figure 3B:
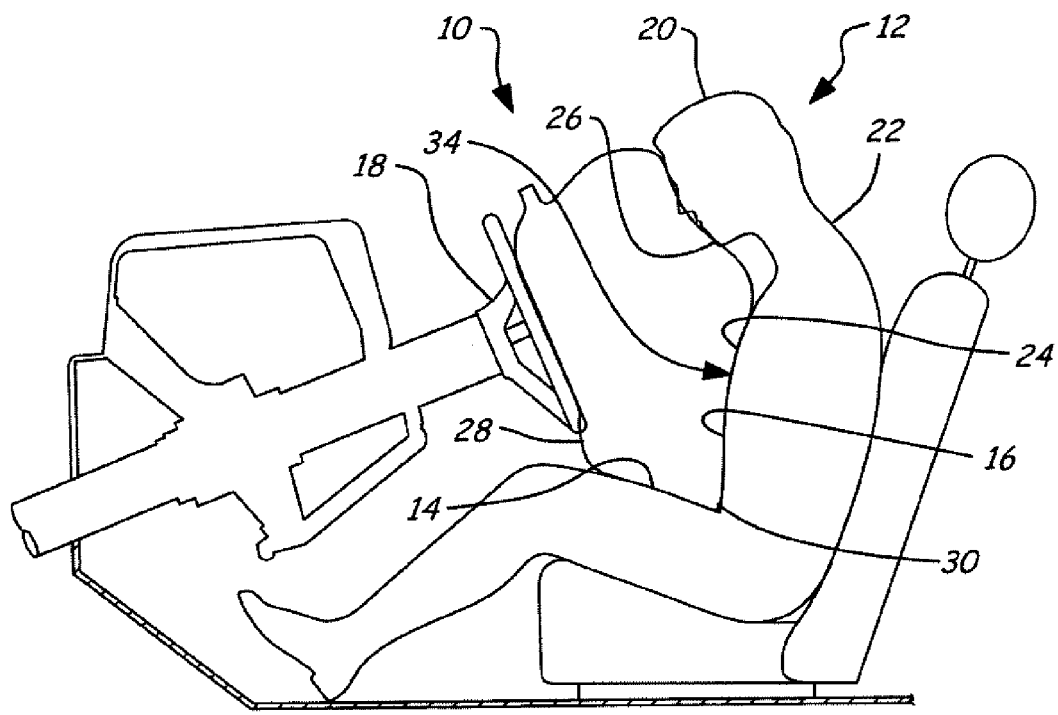
FIG. 3B is a perspective view of the airbag shown in FIG. 2A, illustrating the controlled cushioning of the vehicle occupant's head and neck during the second stage of sequential deployment, according to one embodiment of the present invention.

With particular attention to FIGS. 3A–3B, it will be appreciated that the airbag 10 can minimize the risk of injury to a vehicle occupant 12, e.g. a driver, during a front-end collision. As shown in FIG. 3A, the first stage of deployment can cause the airbag 10 to apply a substantial portion of the "punch our" force to the driver's lap 14 and lower abdomen 16. As is known, this "punch out" force or initial deployment force typically is powerful because it must be sufficiently strong for breaking the airbag 10 out of its steering-wheel housing 18 within a short period of time. This feature is beneficial because it can direct this typically strong deployment force to a portion of the occupant's body, which is sufficiently durable for withstanding such a force. Specifically, it is understood that a person's lap 14 and lower abdomen 16 usually are better suited for withstanding a substantial blow than the person's head 20 and neck 22.

During the first stage of sequential deployment, the airbag 10 also controls the kinematics of the vehicle occupant 12 for preparing him to impact the remainder of the airbag 10 during the second stage of deployment. For example, as seen in FIG. 3A, during the first stage of deployment, the airbag 10 can contact the occupant's lower body and move the occupant's body in a manner that causes him to tuck in his chin 26. Thereafter, during the second stage of deployment as shown in FIG. 3B, the remainder of the airbag 10 can inflate in a controlled and timely manner such that the occupant 12 impacts the remainder of the airbag 10 with his chin tucked in. This positioning of the occupant's body can prevent the inflating airbag 10 from contacting the occupant underneath his chin 26 and forcing his head 20 upward and rearward. It will be understood that this feature prevents substantial pressure from being applied to the occupant's neck 22, which can result in a serious injury. In addition to this example, it is also contemplated that the sequential deployment of the airbag 10 can also position the occupant's body in various other ways for preventing a variety of injuries.

Furthermore, in the first stage of deployment, the airbag 10 includes a vertical columnar portion for providing immediate protection for the occupant's upper body region, e.g. his head and neck. This vertical columnar portion is defined by an upper sub-chamber 42 of the airbag 10 (as detailed in the description for FIGS. 1B and 1C).

Referring now to FIGS. 1B, 2B, and 4, it can be seen that the airbag 10 is an inflatable bag comprised of three interconnected panels. Specifically, these panels include a first outer panel 28 and a second outer panel 30, which is sized substantially similar to the first outer panel 28. The first and second outer panels 28, 30 are attached to each other at their peripheries via stitching or various other suitable fastening methods. Additionally, the first and second outer panels 28, 30 have an inner panel 32 attached therebetween via stitching or various ocher suitable fastening methods. This inner panel 32 is utilized for partitioning the interior of the airbag 10 into a primary chamber 34 and a secondary chamber 36 (shown in FIG. 2B). The primary chamber 34 is inflated during the first stage of deployment before the secondary chamber 36 is inflated during the second stage of deployment. inflated during the second stage of deployment.

However, it will be appreciated that the inflatable bag can instead be comprised of only one panel, two panels, or various other numbers of panels as desired. For example, in another embodiment illustrated in FIGS. 5A and 5B, the airbag is comprised of two panels. These panels include one outer panel 28' and an inner panel 32'.

With particular attention to FIG. 1B, the first outer panel 28 has a primary inlet 38 formed therein for attachment to an inflator device 40. This inflator device 40 injects gas through the primary inlet 38 directly into the primary chamber 34. In this way, the inflator device 40 can inflate the primary chamber 34 during the first stage of deployment.

The primary chamber 34 includes an upper sub-chamber 42 and a lower sub-chamber 44, which together extend substantially across a height of the airbag 10. As respectively shown in FIGS. 1B and 1C, the lower sub-chamber 44 extends substantially across a depth and a width of the airbag 10. This construction allows the lower sub-chamber 44 to apply a substantial portion of the initial deployment force across the vehicle occupant's lap and lower abdomen.

Moreover, as seen in FIGS. 1B and 1C, the upper sub-chamber 42 is sized substantially smaller than the lower sub-chamber 44 along the depth and the width of the airbag 10. In this regard, the upper sub-chamber 42 has a substantially vertical columnar construction for directing the gas in a generally downward direction into the lower sub-chamber 44. For that reason, the airbag 10 deploys in a generally downward direction during the first stage of deployment. It is also understood that the inflation of the upper sub-chamber 42 can absorb a portion of the initial deployment force thereby decreasing the risk of harm to the occupant 12 when the airbag 10 ultimately impacts the occupant's head 20 and neck 22.

Although the upper sub-chamber 42 is sized smaller than the lower sub-chamber 44, it will be appreciated that the upper sub-chamber 42 is sized sufficiently large for providing immediate protection for the occupant's upper body region during the first stage of deployment.

The inner panel 32 has a secondary inlet 46 formed therein for permitting gas to flow from the primary chamber 34 to the secondary chamber 36 during the second stage of deployment. However, during the first stage of deployment, the secondary chamber 36 is held in a collapsed or deflated configuration until the primary chamber 34 is substantially inflated and a threshold pressure has been built up within the primary chamber 34. Specifically, the second outer panel 30 is attached to the inner panel 32 by a releasable tether 48. In this way, the releasable tether 48 can restrict the size of the secondary chamber 36 and prevent that portion of the airbag 10 from being inflated. The releasable tether 48 detaches from either the inner panel 32 or the second outer panel 30 when sufficient pressure has built up in the primary chamber 34, e.g. after that chamber 34 has been fully deployed.

Thereafter, the secondary chamber 36 of the airbag 10 can be inflated during the second stage of deployment.

In one embodiment, the releasable tether 48 is a relatively small amount of stitching with a substantially weak threading. In that regard, the threading can break when gas flows into the secondary chamber 36 with sufficient pressure. However, it is understood that the releasable tether 48 can instead be various other suitable tethers as desired.

Referring back to FIGS. 1B and 2B, the secondary inlet 46 is one or more open vent holes formed within the inner panel 32. In this regard, the open vent holes allow for the free flow or gas between the primary chamber 34 and the secondary chamber 36. Also, in this embodiment, one skilled in the art will appreciate that the inner panel 32 itself comprises a baffle vent 33a with the size of the holes regulating the flow of air therethrough. However, it is understood that the baffle vent 33a can have other suitable constructions as desired.

Also in this embodiment, the secondary inlet 46 is simply a permeable fabric 33b (shown in FIG. 1B) comprising the inner panel 32 or a portion thereof. Similar to the baffle vent, this permeable fabric can meter the flow of gas into the secondary chamber 36 and further protect the occupant's head 20 and neck 22.

With particular attention to FIG. 2B, the airbag 10 further includes a fixed tether 50 attached to and in connection between the second outer panel 30 and the inner panel 32. This fixed tether 50 restricts the second outer panel 30 from bulging outward and maintains an overall uniform depth of the airbag 10 when the secondary chamber 36 is inflated in the second stage of deployment. As shown in FIGS. 2B and 2C, the secondary chamber 36 extends substantially across the width and the depth of the airbag 10. For that reason, the controlled deployment of the secondary chamber 36 can cushion the occupant's head 20 and neck 22 and decrease the risk of injury to those body parts.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

The invention claimed is:

1. An airbag for minimizing a risk of injury to a vehicle occupant, comprising:
   an inflatable bag having a primary chamber and a secondary chamber adjacent to said primary chamber;
   said primary chamber inflating before said secondary chamber and applying a generally downward force to a lower-body portion of the vehicle occupant in order to allocate a substantial portion of an initial impact force to said lower-body portion and to position the vehicle occupant for minimizing a risk of injury to the vehicle occupant;
   said inflatable bag deployed sequentially in a generally linearly upward direction from said primary chamber to said secondary chamber;
   said primary chamber comprising an upper sub-chamber and a lower sub-chamber;
   said lower sub-chamber extending substantially across a width and a depth of the improved airbag and allocating said substantial portion of said initial impact force to said lower-body portion of the vehicle occupant;
   said upper sub-chamber sized substantially smaller than said lower sub-chamber along said depth of the improved airbag;
   said upper sub-chamber absorbing and re-directing said initial impact force generally downward and providing immediate protection for an upper-body region of the vehicle occupant;
   said upper sub-chamber is sized substantially smaller than said lower sub-chamber along said width of the improved airbag.

2. The airbag of claim 1 further comprising:
   a releasable tether attached to said inflatable bag for maintaining said secondary chamber in a collapsed configuration until a sufficient threshold pressure causes said releasable tether to detach from said inflatable bag and allow said secondary chamber to inflate.

3. The airbag of claim 1 wherein said inflatable bag includes a primary inlet for allowing a gas to be injected directly into said primary chamber of said inflatable bag.

4. The airbag of claim 3 wherein said inflatable bag includes a secondary inlet for allowing said gas to flow from said primary chamber to said secondary chamber.

5. The airbag of claim 4 wherein said secondary inlet is at least one open vent hole.

6. The airbag of claim 4 wherein said secondary inlet is at least one baffle vent.

7. The airbag of claim 4 wherein said secondary inlet is a permeable fabric panel integrated within said inflatable bag.

8. An airbag for minimizing a risk of injury to a vehicle occupant, comprising:
   an inflatable bag having at least one panel defining a primary chamber and a secondary chamber that is adjacent to said primary chamber;
   said primary chamber inflating before said secondary chamber and applying a generally downward force to a lower-body portion of the vehicle occupant in order to allocate a substantial portion of an initial impact force to said lower-body portion and to position the vehicle occupant for minimizing a risk of injury to the vehicle occupant; and
   a releasable tether attached to said at least one panel and maintaining said secondary chamber in a collapsed configuration until a sufficient threshold pressure causes said releasable rather to detach from said at least one panel and allow said secondary chamber to inflate;
   said inflatable bag deployed sequentially in a generally linearly upward direction from said primary chamber to said secondary chamber;
   said at least one panel defining said primary chamber with an upper sub-chamber and a lower sub-chamber;
   said lower sub-chamber extending substantially across a width and a depth of the airbag and allocating said substantial portion of said initial impact force to said lower-body portion of the vehicle occupant;
   said upper sub-chamber substantially smaller than said lower sub-chamber along said depth of the airbag and absorbing and re-directing said initial impact force generally downward;
   said upper sub-chamber providing immediate protection for an upper-body region of the vehicle occupant;
   said upper sub-chamber sized substantially smaller than said lower sub-chamber along said width of the airbag.

9. The airbag of claim 8 wherein said at least one panel includes a primary inlet for allowing a gas to be injected directly into said primary chamber of said inflatable bag.

10. The airbag of claim 9 wherein said at least one panel includes a secondary inlet for allowing said gas to flow from said primary chamber to said secondary chamber.

11. The airbag of claim 10 wherein said secondary inlet is at least one open vent hole.

12. The airbag of claim 10 wherein said secondary inlet is at least one baffle vent.

13. The airbag of claim 10 wherein said secondary inlet is a permeable fabric panel integrated within said inflatable bag.

* * * * *